May 5, 1959 R. K. ILER 2,885,366
PRODUCT COMPRISING A SKIN OF DENSE, HYDRATED AMORPHOUS
SILICA BOUND UPON A CORE OF ANOTHER SOLID MATERIAL
AND PROCESS OF MAKING SAME
Filed June 28, 1956

INVENTOR
RALPH K. ILER
BY *Albert B. Griggs*
ATTORNEY 2,885,366

PRODUCT COMPRISING A SKIN OF DENSE, HYDRATED AMORPHOUS SILICA BOUND UPON A CORE OF ANOTHER SOLID MATERIAL AND PROCESS OF MAKING SAME

Ralph K. Iler, Wilmington, Del., assignor to E. I. du Pont de Nemours and Company, Wilmington, Del., a corporation of Delaware Application June 28, 1956, Serial No. 594,423

13 Claims. (Cl. 252—313)

This invention relates to products which are comprised of a skin of amorphous silica and a core of another solid material. The products ordinarily assume the form of finely divided spheres, plates, or fibers of a solid material other than silica enveloped within a skin of impenetrable amorphous silica. The invention is also directed to sols of such particles.

The invention is also concerned with processes for preparing these and other novel products by suspending suitable substrates in water, treating them if necessary so that they will be receptive to silica, and then adding active silica to form a dense shell or skin upon the substrate.

The particles in the products of the invention present surfaces which are dense skins of hydrated amorphous silica bound to a core of another material. This core or substrate is often called herein a "heteronucleus" because it is a nucleus of a material other than silica. The heteronuclei suitable for use according to the present invention will be more fully described hereinafter.

In order that the invention may be better understood reference should be had to the accompanying drawings in which.

THE CORE

The physical form of the cores or nuclei is important in the formation of products of the invention. The core must be a solid and it is preferably in such a state of subdivision that it can be suspended in water. It is specifically preferred for example that cores for use according to the invention be finely divided and have at least one dimension which is less than about 5 microns.

Materials which are suitable for use as cores or nuclei according to the present invention may be long fibers or the comparatively short fibers which may also be termed rods. These may or may not be crystalline. Generally it may be said of the fibers that they are at least ten times as long as their diameter.

The cores or substrates may also assume the shape of plates or plate-like particles.

Where all three of the dimensions are equal or nearly equal the particles assume the shape of spheres.

The substrate preferably is finely divided and has a specific surface area of at least one square meter per gram. For most solids this will mean that the particle size will not be larger than about a few microns. For spheres at a specific surface area of about one square meter per gram the particle diameter will be of the order of 1 to 5 microns depending upon the material of which they are made.

The cores can also be powders which are made up of aggregates of particles in the above size ranges. This will include gels and other porous bodies. The preferred powders and aggregates of particles to be used as substrates according to the present invention are those which are in such a state of subdivision that they can readily be suspended in aqueous systems by stirring. Thus they can have a particle size of about 1 to 50, or preferably 1 to 25 microns. They can be larger, say, up to one-half inch in diameter, but handling becomes very difficult.

Another type of solid which is quite suitable for use as a substrate according to the invention are colloidal particles with a diameter from about 1 to 100 millimicrons. They may be used as aqua sols.

It has been observed that the cores are solids. They may be organic or inorganic and it is preferred that they be comparatively insoluble in water. The core must be water insoluble. It is preferred that the cores be inorganic. By "water insoluble" is meant that no more than about 0.1 percent of the material is soluble in water at 25° C.

Chemically the cores are composed of a material other than silica. It is important that they be chemically receptive to the attachment of the silica skin or that they be made receptive by a suitable treatment as will be hereinafter described.

In considering the chemical character of the cores it will be apparent that the entire core need not be the same in composition. It is only important that the surface of the core be reactive or be made subject to bonding with the silica skin while the interior of the core may have any composition.

The cores or substrates or nuclei are covered with a silicate or an oxide of a metal which forms an insoluble silicate at a pH between 7 and 11. Metals which fit this description are copper, silver, barium magnesium, beryllium, calcium, strontium, zinc, cadmium, aluminum, titanium, zirconium, tin, lead, trivalent chromium, manganese, iron, cobalt, and nickel. Combinations of two or more of these metals may also be used.

It will be understood that when an oxide of the metal is mentioned that the oxide may be hydrated, as many of them are in aqueous solution.

While by visual observation a metal may appear to be free of oxide coating, nevertheless, upon proper examination it will be found that any metal in contact with atmosphere and moisture very quickly develops an extremely thin oxide or hydroxide coating.

A mono layer is preferred, but the coating need not be continuous. It is sufficient if there are at least spots of an available metal compound as indicated. These spots will then serve as anchors for the skin of amorphous silica. It will be understood that there ought to be fairly uniform distribution of these anchoring points so that as the skin builds up it will bridge over and be firmly attached to the core.

Instead of starting with a metal silicate or metal oxide core or a core coated with such a material one may instead start with any of numerous metal compounds which are water insoluble and which upon contact with an alkaline solution containing silicate ions will immediately form a thin coating of the metal silicate. For example there may be used water insoluble sulfides, halides, carbonates, and phosphates such as zinc sulfide, silver chloride, barium sulfate, aluminum phosphate, zirconium carbonate, and titanium phosphate and other such compounds of the metals just listed.

Typical of cores composed of materials of the type which have just been discussed are the following: Finely divided metal particles such as iron, nickel, and aluminum powders. Metal oxides, and hydrated oxides such as aluminum oxide, chromium oxide, iron oxide and nickel hydroxide, titanium dioxide, zirconium oxide, zinc oxide, and cobalt oxide. Metal silicates such as magnesium, aluminum, zinc, lead, chromium, copper iron, cobalt, and nickel silicates. Natural metal silicates such as the various varieties of clay including kaolin, bentonite, attapulgite, halloysite. Natural fibrous metal silicates such as chrysotile asbestos, talygorskite, amosite, crocidolite, and wollastonite. Plate-like mineral silicates including various varieties of mica such as exfoliated vermiculite, muscovite, phlogophite, biotite, talc, and antigorite. Finely divided synthetic metal silicate products such as Fiberglas and rockwool.

The foregoing metals, metal oxides, silicates or other compounds may be used in the form of aqueous sols or suspensions. For example, sols of alumina, bentonite sols, colloidally dispersed chrysotile asbestos, colloidal titanium dioxide sols, colloidal ferric hydroxide sols, and the like may be used as cores.

Gels of any of the foregoing may similarly be used providing they are broken up into a fine suspension so as to permit penetration and access by the active silica into the surface of the units to form a skin on the ultimate particles of which the gel is built. For example, alumina gels, aluminum silicate gels, and bentonite gels may be used. The size to which the particles are broken is purely a matter of choice and mechanical convenience as already noted. However as a mechanical matter the particles ought not to be too big, say, under one-half inch in diameter or so, so that the treating solution can readily have access to all parts of the substrate being treated. However, so long as the material has a specific surface area in excess of one square meter per gram, the substrate can be coated according to the processes of the invention.

The materials which have just been discussed are typical of materials which serve as cores or which, if present on the surface of cores, serve to bond the skin of amorphous silica in place. It is not, however, necessary that the core be chemically of a nature such that the silica will bond directly to the core. For example, as has already been observed, the core need not be homogeneous throughout but may have only a surface layer of one of the materials previously described.

However, it will often be found more convenient and more practical to give other surface treatments of a kind which will now be described.

Materials which can be used as cores but which will not readily accept an adherent skin of amorphous silica are such things as cellulose, paper pulp, cotton fibers, cellulose acetate, rayon, nylon, or the particles in Bakelite emulsions, polystyrene emulsions, and other emulsions of insoluble organic polymers, rubber, such as natural rubber ar synthetic latex commonly referred to as conjugated diene elastomers, colored pigments such as copper phthalocyanines, and other organic materials in various such physical forms as have previously been described.

In preparing the above for use as cores or substrates according to the invention, they ought to be suitably coated with a material which is receptive to silica. For example, they may be treated with a solution of a basic salt of a metal such as chromium or aluminum. These metals are particularly effective in being adsorbed upon the surface of a wide variety of core materials and they need only be used in sufficient amount to provide anchoring points on the surface of the cores as has previously been described. Typical basic chromium salts and aluminum salts which may be used are basic aluminum chloride, basic chromic chloride, basic chromic sulfate, alum, basic aluminum acetate, or basic aluminum formate.

Other of the metals previously described may be applied in similar manner to materials which will not themselves readily accept and bond a skin of dense amorphous silica.

It is to be noted that most of the suspensions of organic materials as previously described contain at least a small proportion of ionizable groups or polar groups which provide sites of attachment for the metal mordants as described. Thus cellulose appears to have an affinity for aluminum and chromium through some type of complex formation with the hydroxyl groups of the cellulose. Similarly the chromium is adsorbed by the polar groups in the surface of nylon fibers. In the case of dispersions of organic polymers, these are usually stabilized with detergents such as soaps, or anionic wetting agents, and it is these materials which anchor the metal ions to the surfaces of the cores, although the emulsions may thereby be coagulated.

The art of mordanting organic materials so that they will accept dyes is already well understood and no reason is seen for discussing this matter in further detail here. The methods already well known in the art may be used for mordanting the organic materials to apply to them a metal compound which can subsequently be converted to the silicate.

The various substrates as above described are suitable for use in processes of the invention only if after the treatment they still have a surface area in excess of one square meter per gram.

THE SKIN

The primary characteristic of the skin is that it is composed of amorphous silica. The silica is dense and is hydrated and is bound upon the core.

The skin is characterized by being of substantially uniform thickness, by being dense as will be hereinafter more specifically described, and by being continuous. It may be noted further that by continuous it is meant that the skin follows the configuration of the surface of the substrate. If the substrate is a gel then the skin will extend into the pores, leaving a porous product which has a decreased specific surface area but which still retains substantially the same shape.

The skin applied according to the invention is dense. That is to say it is not porous. This can readily be shown, for example, by measuring the surface area, by nitrogen adsorption. It will be seen that if the coating were not dense but were porous the specific surface area of the product would be even greater than the surface area of the nucleus or substrate. Actually the surface area drops because when a dense coating is applied on a surface of given area, the specific surface of the composite product is less. It will also be observed that the skin is dense because in many cases it will be possible to subject the nucleus which is coated with the skin to chemicals which would attack the substrate but not the skin, and the skin will be found to protect the substrate from the reagent.

In saying above that the specific surface area drops, it is to be noted that this discussion relates to cores and substrates which have a density comparable to that of silica or lower. If the core or substrate has a much higher density than silica, one can determine how the specific surface area will change with varying degrees of coatings. Thus with these it can be again seen that because of the density of the coating applied there is no increase in specific surface area, correcting the substrate back to the same density as silica. This is expressed mathematically hereafter.

It has already been pointed out that the surface of the substrate should be receptive to silica. By this it is meant that the silica is chemically combined with the surface of the substrate and as the skin is thereafter increased in thickness the skin as a whole will be chemically attached to the surface of its substrate.

Products of the invention can readily be identified.

For example, a reagent may be used which will dissolve or attack the skin but not the substrate and the skin can be removed. This can be used as an analytical method to determine the thickness of the skin and its relation to the substrate.

It will be observed that the skin or coating will ordinarily vary in thickness depending upon the particular use to which the product is to be put. The thickness of the skin should ordinarily be at least a few atoms and, for instance, the skin should for most purposes not be thinner than about three millimicrons corresponding to, say, 5 to 10 atomic diameters. Generally, then, it will not be found desirable in most cases to have a skin thicker than about 100 millimicrons, and for the majority of uses it will be sufficient to have a skin no thicker than 25 millimicrons.

The thickness of the skin can be estimated from the total surface area of the product and the total weight of the skin in the product which may be determined either by dissolving off the silica from the core with suitable reagents or dissolving the core away from the skin. The latter is often difficult to carry out and requires prolonged treatment because the skin tends to protect the core from chemical attack.

Thickness can also be observed directly by electron micrograph in some cases. It can also be estimated from the change in the apparent size, or specific surface area of the original substrate as compared with the finished product determining the apparent size by electron micrograph or the specific surface area by nitrogen adsorption. In other words, concerning this latter method a sample of the substrate before application of the skin can be compared with the product carrying the skin. The apparent thickness of the skin can be directly observed by comparing electron micrographs of the two materials. Alternatively, the surface area of the two materials may be compared using nitrogen adsorption and from the amount of silica computing the average thickness of the skin. It is preferred for purposes of identification of products of the present invention and is most direct to subject the finished product to severe grinding or attrition and then to examine the fragments to find typical broken areas where the original substrate can be viewed on the thickness of the skin observed directly by electron microscope.

One characteristic of the skin is that the silica is hydrated. By this it is meant that there is water chemically bound to the skin in the form of hydroxyl groups. An amorphous silica skin of this type differs from anhydrous silica surfaces by the fact that the surface area as determined by the adsorption of methyl red dye, by a method hereafter described, is approximately equivalent to the surface area as determined by nitrogen adsorption. In some cases the hydrated surface has an affinity for somewhat more dye than corresponds to a monolayer of dye molecules thus giving calculated areas somewhat higher than those obtained from nitrogen adsorption. On the other hand silica surfaces which are not hydrated are characterized by the fact that the area as determined by dye adsorption is less than that determined by nitrogen adsorption since adsorption of the dye is dependent upon the presence of hydroxyl groups upon the surface. Alternatively it will be understood that the presence of water of hydration can be determined chemically when the skin can be separated from the core or when the core does not itself contain significant or unknown amounts of water.

The method used for measuring specific surface area by nitrogen adsorption is that of P. H. Emmett, "A New Method for Measuring the Surface Area of Finely Divided Materials and for Determining the Size of Particles," Symposium on New Methods for Particle Size Determination in the Sub-Sieve Range, p. 95, published by the American Society for Testing Materials, March 4, 1941.

The method for preparing sols or suspensions for determination of nitrogen adsorption will be discussed later in connection with the process.

The specific hydroxylated surface area by dye adsorption can be determined as follows:

The specific hydroxylated surface area of the products of this invention can be measured by a dye adsorption method. This test indicates the surface area per gram of sample which is available to the methyl red dye molecule. For this test, it is necessary that the sample be dried at least 4 hours at 110° C., in an air oven, but in no case at a higher temperature than 150° C. This limitation on drying is necessary, since it is believed that methyl red is adsorbed only on a hydroxylated surface, that is, a surface covered with silanol groups. The methyl red adsorption test is carried out by agitating in 25 milliliters of an anhydrous benzene solution containing 0.6 to 0.7 gram of the acid form of methyl red, paradimethylamino azobenzene orthocarboxylic acid, $$(CH_3)_2NC_6H_4N=NC_6H_4COOH$$

per liter, a suspension of a few tenths of a gram of the dried silica sample to be tested. No more than about 0.7 gram of this sample should be used in the test. Appreciably less must be used with voluminous samples, to avoid getting a mixture too thick to handle. Within the latter limitations, however, the amount of sample used should provide as near as possible a total available hydroxylated surface area of 10 square meters in the test. The test mixture is agitated for about two hours at about 25° C., to reach equilibrium conditions; a final concentration of about 400 milligrams of dye per liter in the solution after equilibrium is necessary to insure saturation adsorption.

The decrease in dye concentration in the benzene solution is determined by adsorption spectrophotometric observations at 4750 A. of both the original and equilibrium benzene solutions of methyl red. The specific hydroxylated surface area in square meters per gram is calculated from the formula:

$$S_a = \frac{\text{grams dye absorbed} \times 116 \times 10^{-20} \times \text{Avogadro's No.}}{\text{grams sample employed} \times \text{molecular weight of methyl red}}$$

where the covering power of each adsorbed methyl red molecule is approximately 1.16 square millimicrons.

APPLYING THE SKIN TO THE CORE

Processes of the invention are carried out by suspending the material to be used as the substrate or core in water and by then adding thereto active silica. Throughout the pH should be maintained between 8 and 11.

Silica is added as "active silica." In general it may be said that "active silica" is very low molecular weight $SiO_2$, which may be added as such to the solution, or formed in situ as by the addition of acid and a soluble silicate.

When sodium silicate is acidified, silicic acid is released. This silicic acid initially may be in the form of orthosilicic acid, $Si(OH)_4$, but a condensation reaction occurs, whereby two silanol (—Si—OH)

groups react to form a siloxane (—Si—O—Si—)

bond. This condensation may proceed until a predominate proportion of the silanol groups present have been used up to form siloxane bonds; the polymer thus formed will have a high molecular weight and the silica in it may be defined as "inactive." On the other hand, it will be understood that by the term "active" silica is meant silica in a low degree of polymerization. Thus, in active silica the condensation between silanol groups has not proceeded to a predominant extent.

It should be understood that active silica includes not only monomeric silica, but also certain polymeric forms of silica which are capable of depolymerization under suitable conditions, and hence are active for the purposes of the present invention. The rate of depolymerization under controlled conditions provides a measure of whether or not a particular silica is active within the meaning of the term as used in describing this invention. Active silica may be defined as any silica in molecular or colloidal aqueous solution in such a state of polymerization that when diluted with sodium hydroxide solution to a pH of about 12, corresponding to an alkali concentration of N/100, and an $SiO_2$ concentration of about 0.02% by weight at 30° C., in the absence of cations other than the sodium, the silica will depolymerize to monomer in not more than 100 minutes.

The amount of monomer in a particular solution may be determined by measuring the amount of color developed with molybdic acid. It was shown by Harman (J. Phys. Chem. vol. 31, 616–25 (1927)) that yellow silico-molybdic acid complex is formed by reaction of molybdic acid with ionic or "crystalloidal silica" but not with colloidal silica. I confirmed this observation, and concluded that only mono-silicic acid forms the yellow complex with molybdic acid. Hence, the rate of depolymerization of silica in the dilute alkaline test solution can be followed over a period of time by taking samples and determining the amount of monomer present.

Specifically, the depolymerization test is carried out by adding the silica sample to such quantity of a dilute solution of sodium hydroxide that the pH of the mixture is about 12 (corresponding to 0.01 normality of alkali) and the total concentration of $SiO_2$ is 0.02%. This mixture is held at 30° C. for a measured time after preparation, and then tested for monomer. Five ml. of the depolymerizing solution are mixed with 45 ml. of a molybdic acid reagent made up by diluting 25 ml. of 1 N sulfuric acid and 10 ml. of 10% (by weight) ammonium molybdate solution to a total of 225 ml. The molybdic acid reagent is sufficiently acidic to stop the depolymerization of silica in the test sample. Thus, the time interval of depolymerization is taken as the time between the mixing of the silica sample with sodium hydroxide solution and neutralization of this solution with molybdic acid reagent. The color developed in the depolymerizing solution and the molybdic acid reagent at 30° C. is measured with a Model DU Beckman photoelectric quartz spectrophotometer at a wave length of 400 millimicrons and a cell length of 1 cm. The color reading is taken after about 2 minutes, since the reaction of monomeric silicic acid with molybdic acid is essentially complete in that time. The amount of monomeric silica corresponding to this color is determined by standardizing the color against a known amount of sodium orthosilicate.

While silica which depolymerizes completely in not more than 100 minutes by the depolymerization test is considered to be active and may be used in the present invention, it is preferred to use silica which will depolymerize completely in not more than 5 minutes. In sodium silicate solutions having an $SiO_2:Na_2O$ mole ratio below 3.9, the degree of polymerization of the silica is very low, since when these solutions are subjected to the depolymerization test for activity, the time required for formation of monomer is usually less than one minute. Consequently, the silicic acid released the instant these solutions are acidified is in an extremely active form.

An aqueous dispersion of active silica may be prepared at ordinary temperatures for use in this invention by any of a number of methods with which the art is familiar. Methyl silicate or silicon tetrachloride may be hydrolyzed with water under conditions to produce a dilute sol, or sodium ions may be removed from sodium silicate by ion-exchange resins as taught by Bird, United States Patent 2,244,325. The active silica obtained by any of these methods should be used as soon as prepared, because the condensation reaction mentioned above proceeds quite rapidly, rendering the silica inactive.

A method which has outstanding economic advantages in the preparation of active silica for use according to this invention consists in releasing active silica by partially neutralizing a soluble silicate, such as sodium or potassium silicate, with an acid such as sulfuric, hydrochloric, or carbonic, in the pH range of 8 to 11.

Preferably, this acidification occurs in the presence of the heteronuclei prepared as already described.

Instead of releasing the active silica in the presence of the heteronuclei, by the partial neutralization of a silicate with an acid, the acidification may, if desired, be carried on out of contact with the heteronuclei providing the active silica is added to the substrate before it has become inactive through polymerization, that is, before it has aged or been heated to an elevated temperature.

The pH of the system should be maintained between about 8 and 11. This can be done by adding suitable proportions of either acids or alkali depending upon the ratio of alkali to silica in the sodium silicate which is employed. It will be understood that any suitable acid or alkali may be used and there may be employed for instance mineral acids such as hydrochloric, sulfuric, nitric, or carbon dioxide. Again one may use sulfamic acid or organic acids. Sodium hydroxide, sodium silicate and the like may be used as alkalis.

The alkali metal ion concentration is held below about 1 normal during formation of the skin, and is preferably held below 0.3 normal. Above 1 normal, the rate of coagulation of the active silica is such that aggregates tend to be formed, and this should generally be avoided. When the active silica is added in the form of fresh ion-exchange effluent the control of alkali metal ion concentration presents no problem. When the active silica is formed in situ by adding acid and alkali metal silicate, it will often be found desirable to use as high a $SiO_2:Na_2O$ ratio silicate as possible, and dilute the reaction mixture if necessary to hold down the alkali metal ion normality. A normality of 0.1 to 0.3 ordinarily is found to be a practical working range.

The temperature of the reaction mixture is maintained in the range from 60 to 125° C., and preferably about between 80 and 100° C. at atmospheric pressure, or up to about 125° C. under super-atmospheric pressures. Below 60° C. it is difficult to bring about the formation of a skin at a practical rate and there is no great advantage in operating at temperatures above 125° C. It is most preferred to operate close to the boiling point at atmospheric pressure.

The rate at which the skin is formed is related to the pH, the alkali metal ion concentration, the temperature, and the specific surface area of the cores. Formation of the silica skin occurs rapidly at about pH 10 in the presence of sodium ions. Active silica can be formed into a skin more readily at a higher temperature. The relation between time and temperature may be roughly estimated from the observation that the reaction rate doubles for about every 10° C. rise in temperature, within the ranges above mentioned.

As the specific surface area increases, there is more surface on which the skin can build and hence the skin formation can be carried out more rapidly in dispersions containing cores of high surface areas. However, if active silica is liberated too rapidly in the mixture, it may fail to form a skin on the cores, but instead much of it may form new nuclei of dense spherical particles of silica. In this event, the reaction mixture will contain coated cores and silica particles. Upon further addition of active silica these two types of material will compete for the active silica with the result that the cores will not be further coated with skin to the same degree as would have been the case had the silica particles not been formed.

During the formation of the skin on the cores the release of active silica is effected at a rate such that the specific surface of the coated cores decreases. When active silica is released in a suspension of cores according to the present invention the specific surface area of the coated cores becomes continuously less as the thickness of the skin is increased. This is because the weight of the average core is increased more rapidly than the surface area so that the specific surface area as determined by nitrogen adsorption, which is the area per unit per weight, actually decreases.

The above is, of course, true only when the cores are of materials which are no heavier than the silica skin. If the cores are heavier than the silica the progressive development of the thickness of the skin can be calculated by taking into account the relative specific gravities of the core and the specific gravity of amorphous silica which is about 2.2 grams per cc.

The change in surface area can be more generally expressed and in a manner which is applicable to cores of widely different densities by an expression as follows:

$$dS = (A_3 D_3) - (A_2 D_2) = 0 \text{ or less}$$

where $dS$ = the change in the observed surface area per unit volume of solid
$A_2$ = the specific surface area of the core or substrate in $M^2/g$.
$A_3$ = the specific surface area of the coated product in $M^2/g$.
$D_2$ = the density of the core in grams per cubic centimeter, this being the density of the material of the core rather than a bulk density of the core particles
$D_3$ = the density of the coated product in grams per cubic centimeter.

Using any core or substrate material which has a density no greater than silica the observed specific surface area can be taken without any particular reference to the density of the starting core. As stated above, the specific surface area will not increase in processes of the invention with such cores. With cores which are notably heavier than silica the above expression should be used in order to observe whether the surface area of the silica coating is increasing as by the formation of a gel in contrast to a dense skin.

The rate of addition of active silica to a substrate can very readily be determined as set out above with the purpose of not allowing any great increase of surface area. The rate can be even more specifically described with reference to the most preferred conditions. Under such conditions the surface area and amount of heteronuclei and the temperature of the system must be taken into account. Most desirably the addition of active silica is made at such a rate that a great portion of the silica forms a coating upon the substrate and at the most only a little forms new nuclei.

At 90° C. with nuclei having a surface area of 200 $M^2/g$. one can add up to one part by weight of active silica per hour for each part by weight of heteronuclei in the system to be treated. For each ten degree drop in temperature the amount of active silica to be added should be cut in half. If a higher temperature is used the amount can be doubled for each ten degree rise in temperature. Thus at 100° C. two parts of active silica may be added for each part of heteronuclei being treated.

If the surface area is smaller, active silica should be added more slowly. Thus with nuclei having a specific surface area of 100 $M^2/g$. and being treated at 90° C., one could add one-half part of active silica by weight per hour for each part of heteronuclei.

The most preferred conditions can be expressed as follows:

$$S = \frac{(A)}{(200)} 2^n$$

where $$n = \frac{(T-90)}{10}$$

$S$ = maximum parts by weight of active silica which can be added per hour for each part by weight of heteronuclei in the system being treated
$A$ = surface area in $M^2/g$. of the heteronuclei
$T$ = temperature in degrees C.

The expression above given is concerned with the maximum rate of addition of active silica for the most preferred conditions of operation. More can be used as is set out in some examples and as set out elsewhere in the specification providing the surface area does not markedly increase as has already been discussed.

Any smaller amount of active silica can be used having in mind only the practical limitation that equipment is tied up and it is not ordinarily desirable to add the silica more slowly than is necessary. From one-half to one-tenth as much silica can practically be added per hour.

It is noted that the above equation is applicable to the ordinary system in which the soluble salt content of such soluble salts as sodium sulfate is low, that is, below 0.1 N. If the soluble salt content is higher, the amount of active silica added per hour can be increased. Thus if the soluble salt content is as high as 0.3 N, the amount of active silica can be added at aproximately double the rate shown above.

In processes of the invention such cores as those above described which do not have a silicate coating are first treated with a silicate to form at least a monolayer of silicate on their surfaces. This can be done by adding a small amount of a suitable soluble silicate such as sodium silicate to the suspension of the cores while maintaining the pH between 8 and 11. Metal oxides and other metal compounds, as previously described, on the surface of the cores will absorb and react with silicate. The resulting coating then serves to anchor and bond the skin in place. It will be noted that the step can be carried out if desired by releasing active silica in the suspension at the indicated pH of operation but this will sometimes have the disadvantage that there will be considerable formation of new silica nuclei with the disadvantages previously noted.

It will be understood that the selection of pH will in particular situations be determined by the nature of the substrate. If a substrate, for example, is attacked by alkali, then the pH of operation should initially at least be kept at the lower part of the range. After a skin has begun to form on the cores the pH can be raised if desired.

In forming a suspension of cores for treatment according to processes of the invention it is in general preferred to operate under such conditions that the amount of the core material in the suspension is as great as will still permit good agitation. The reason for this is that it is desirable to maintain as high an amount of core surface as practical in the suspension. Cores of low specific surface area may be used in a relatively higher concentration in suspension than those of high area. For practical reasons the concentration of core material in the suspension should be above about 1 percent since smaller amounts will make it necessary to add the active silica at an extremely slow rate. As noted, the upper limit is a purely mechanical one and with particles or aggregates of fairly large size no more than about 40 percent or preferably from 1 to 20 percent by volume of the substrate should be present in water. If the particle size is very small the viscosity of the solution increases and in this event the amount should be less than that which would give a viscosity in excess of 1,000 centistokes. Preferably the viscosity would not exceed 100 centistokes for easiest mechanical handling.

If the products produced by processes above described are sols they may be used as such. Or they may be concentrated before use if desired. Depending upon the materials used it may be preferred to remove soluble metal salts by such a process as dialysis or ion exchange using a suitable ion-exchange resin. The sols can also be dried by evaporation of water or the water may be removed by azeotropic distillation with an alcohol such as butanol or isopropanol or another miscible liquid. Alternatively it may be desired to transfer the dispersed particles to a liquid other than water, for example, ethylene glycol, and this may be done by adding ethylene glycol and removing the water. Alcohols such as those above mentioned can similarly be used.

Where the materials are large enough to be recovered from the reaction medium by filtration or by centrifuging this can be done. Soluble salts can be separated by washing with water. The products may either be dried from water or may be dried by azeotropic distillation by the use of suitable solvents such as normal butyl alcohol. The water may be displaced from the precipitate by the use of water miscible organic solvents such as normal propanol, butanol, and ethyl alcohol.

THE PRODUCTS

The products of the invention have already been described in connection with the description of the skin and particularly in connection with the description of the processes of making and recovering the products. However, in order that the character of the products may be better understood reference should be had to the drawings in which characteristic particles produced according to the invention are illustrated.

Figure 1:
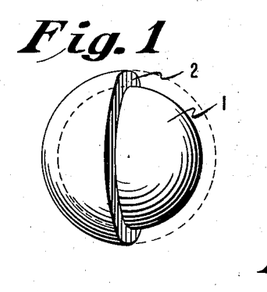
Figure 1 illustrates a particle of the invention partly in section so that the core and skin can each be seen.

In Figure 1 there is illustrated a hetero-nucleated product produced according to the invention. The particle has a spherical core 1 which may be any of the materials previously described as cores. The core is provided with a skin 2 which is composed of dense amorphous silica. It will be understood that the particle is completely covered by the skin and is shown in the perspective view as cut away to expose the core.

The particle is typical of those produced in sols in which the starting substrate is a sol material such as collodial aluminum silicate. The particle of Figure 1, if a particle in a sol, will ordinarily have a size from about 1 to 100 millimicrons. The skin will ordinarily have a thickness, as has previously been described, not substantially greater than 100 millimicrons though it may be thicker. If the coating is thinner than about 3 millimicrons it will be difficult to observe with the electron microscope and the thicknesses must be determined by indirect methods such as have been already discussed. In general it is preferred to use a skin which is at least one millimicron thick because below this figure it is often doubtful whether there is a continuous or valuable coating.

Figure 2:
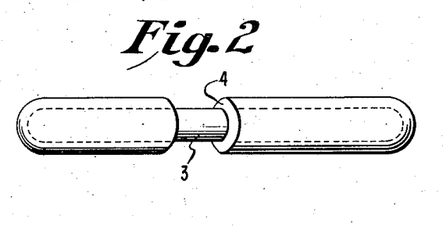
Figure 2 is a similar showing of a particle of the invention which is a fiber or rod-like solid.

Figure 2 illustrates in perspective a fiber produced according to the present invention. The core 3 is enveloped in a skin 4. The skin is broken away to show the core.

It will be understood that the fiber is illustrative of those of the invention and may be many times longer than the one illustrated. On the other hand they may be so short as to be more specifically termed rods. Cores, for example, which are about 10 times as long as they are thick, or longer, can be called rods. They may also be termed short fibers.

It will be understood that these rod-like or fiber-like cores are not necessarily round in cross section but may be ribbon-like or oval or angular in cross section. They may, of course, also be crystalline. It is also to be noted that these rods may be hollow, even at these tiny diameters such as in certain types of naturally occurring silicates.

Figure 3:
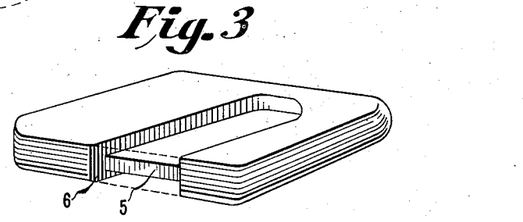
Figure 3 represents a further modification in which the particle of the invention is plate-like, and Figure 4 illustrates a further modification of the invention in which the coating of the invention is somewhat irregular and compares it with deposits which are not skins.

In Figure 3 there is illustrated a plate-like core 5 which is enveloped by a skin 6 of amorphous, dense silica. Plate-like cores have been discussed above and typical of this class are the micaceous minerals.

Figure 4:
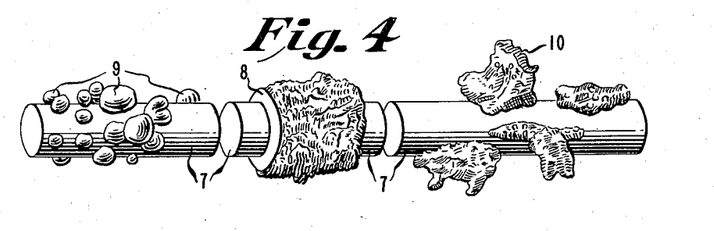

In Figure 4 there is illustrated a core 7 which is shown as having different types of silica coatings. The coating in the center portion which is numbered 8 is a dense amorphous, hydrated silica skin according to the present invention. It should, of course, envelop the entire fiber or rod but the short section shown is illustrative of the character of the skin. It will be observed that the skin is homogeneous but is not of exactly uniform thickness throughout. It will be seen that though it is rough it is nevertheless continuous and impervious. Such rough skins are sometimes obtained by processes of this invention under such conditions that colloidal silica particles are incorporated into the skin, thereby giving the rough surface effect.

At the end of the fiber there is shown a coating such as is obtained by the deposition of colloidal silica on the rod. The individual silica particles 9 are loosely adherent and are scattered about the surface in a random fashion. They do not provide a continuous skin. This is the type of coating which is obtained when silica sols which are not active are applied to fibers. According to the present invention it is desired accordingly to release active silica as by the addition to a suspension as described above.

At the right end of the fiber in Figure 4 there is illustrated particles of silica gel 10 loosely adherent upon the fiber. Such gel particles are obtained, for example, when sodium silicate and acid are reacted in solution rapidly in the presence of a fibrous material, thus forming a silica gel which is deposited in irregular masses upon the fiber surface. Such gel particles are highly porous and while they may adhere to the core they do not provide an impervious or continuous skin.

It is to be observed that while discontinuous coatings of silica particles such as the particles 9 and discontinuous particles of gels such as the gel particles 10 may appear to form a "film" or "coating," electron micrographs or the other methods previously described will show that the coating is neither dense nor impervious.

Figure 5:
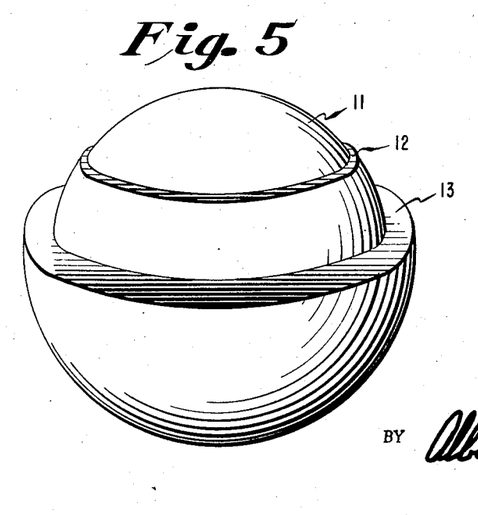
Figure 5 is a similar showing in perspective and cross section illustrating a spherical particle which is similar to that of Figure 1 but composed of a core bonded to a skin through an intermediate bonding layer.

In Figure 5 there is shown in perspective a particle similar to that illustrated in Figure 1 but the particle in Figure 5 has an intermediate bonding coat shown. It will be seen that the figure is cut away so that the core and various coatings may be readily observed.

The core 11 may be any of the types of materials previously described, such as zinc sulfide, which require an intermediate coating to permit the formation of a tight bond between the skin and the core. 12 represents a coating of zinc silicate which is formed by treating the core in suspension with a silicate. The skin 13 is thereafter applied to the intermediate layer 12 as has already been described.

It will be understood, of course, that the figure is illustrative since the core 11 may assume any other shape. It will also be understood that it will not ordinarily be possible to see the intermediate bonding layer 12 but its existence is demonstrated by the process of its formation. The existence of this layer is the best theory which I have formulated to explain the structure of products of this character.

Characterization of the product has been described above in connection with the description of the skin and processes of applying the skin to the core. It is additionally to be noted, however, that the skin is soluble in sodium hydroxide solution at a different rate from the core. Most cores, for example, will be substantially insoluble in sodium hydroxide and the skin can be dissolved rather rapidly from the core. For example, in the case of nickel powder the silica skin can be removed by treatment with 1% caustic solution without affecting the nickel core.

Products of the present invention are easily characterized by the fact that substantially all of the surfaces of the particles consist of amorphous silica until the skin is removed from the cores. This is quite different from a mechanical mixture of the silica with the core material because the cores will have a specific depolymerization rate quite different from that of silica because of course the core material will not be dissolved at the same rate as the silica.

The specific depolymerization rate just discussed can be determined as follows: The sample is treated with 0.01 normal sodium hydroxide solution at 30° C. and measuring the rate of monomer formation, i.e., the rate of depolymerization.

The specific depolymerization rate is defined as ten thousand times the rate of monomer formation per minute, divided by the specific surface area of the depolymerizing particles at the time of measurement of rate of monomer formation. Stated mathematically, $$K = \frac{10^4 \, (dm/dt)}{S_n}$$

where $K$ is the specific depolymerization rate $(dm/dt)$ is the rate of monomer formation per minute, and $S_n$ is the original specific surface area of the sample tested.

The silica dissolved during depolymerization is measured with the molybdate reagent, as already described for the measurement of active silica. When the measurements are carried out on dry powders of this invention, the procedure consists in washing with dilute hydrochloric acid to remove any surface adsorbed metal ions, followed by small successive portions of distilled water, followed by acetone washing and drying at 110° C. A sample containing about twenty milligrams of silica skin is then accurately weighed and transferred to 100 milliliters of 0.01 N sodium hydroxide solution maintained at 30° C. The slurry is agitated vigorously by bubbling with nitrogen gas saturated with water vapor at 30° C. At appropriate intervals, determined by the rate of depolymerization, usually between 5 and 90 minutes, 5 milliliter aliquots are withdrawn from the depolymerizing solution and mixed with 45 milliliters of the freshly prepared molybdate reagent. The optical density measurements are made with the Beckman Spectrophotometer, as already described for the determination of active silica. The amount of monomer present at any time can be calculated from the optical density reading by comparison with the final color for complete depolymerization (100% monomer).

Six to eight monomer-time readings are taken during the time that approximately half the skin is depolymerized. Total silica is analyzed in the same manner as already described, by heating the solution to 90–100° C. until complete depolymerization of the skin has occurred, as is shown by the absence of variation between consecutive analyses.

From a knowledge of the time intervals at which the monomer concentrations were measured, and of the amount of silica present as monomer at these time intervals, a graph of the monomer concentration vs. time can be constructed. The percent silica present as monomer is usually plotted as the ordinate, while the time in minutes is plotted as the abscissa. The slope of the line so obtained can then be used to calculate the rate of monomer formation per minute. The specific depolymerization rate, $K$, is then calculated as described above. The preferred products of this invention have a skin with a specific depolymerization rate of from 5 to 20, at a point where 30 percent of the skin has been depolymerized to monomer.

In other words a product of the invention which has a skin of amorphous silica is characterized by having a specific depolymerization rate from 5 to 20 as described above. The presence of any considerable amount of uncoated core material or mechanically admixed silica or silica gel will lead to figures outside this range.

As pointed out heretofore in describing processes of the invention the products of the invention have surface area per gram of the product which is lower than that of the core material. This is true of course only if the density of the core is about the same or is lower than the density of silica. If the density is higher the character of product can be expressed by the general equation which also covers less dense substrates by saying that the change in surface area is no greater than zero when expressed as follows:

$$(A_3 D_3) - (A_2 D_2)$$

where $A_2$ = the specific surface area of the core or substrate in $M^2/g$.
$A_3$ = the specific surface area of the coated product in $M^2/g$.
$D_2$ = the density of the core in grams per cubic centimeter, this being the density of the material of the core rather than a bulk density of the core particles
$D_3$ = the density of the coated product in grams per cubic centimeter.

The products can be used for a wide variety of uses because of the variation in possible nuclei. The products as sols or as finely divided precipitates will exhibit the surface characteristics of silica and can be used in any of the various places in which silica sols or fine silicas have heretofore been used. They may, for example, be used for the treatment of textile fibers, as rubber fillers. They may be used in latex, waxes, in resins, water paints, and in coating and adhesive and film forming compositions generally.

However, the applications of the products are even more varied because of the heteronuclei having specific characteristics which may be brought into play. For example, the high opacity of titanium dioxide particles permits the preparation of stable sols having the high opacity of $TiO_2$ with the chemical characteristics of silica. Thus when such sols are dried they form insoluble coatings on glass and they have insolubilizing effects in water dispersions of organic polymers such as polyvinyl acetate. This provides combined opacifying and insolubilizing actions.

Where zinc sulfide phosphors are used as cores and are given a skin of silica according to the invention, the cores retain their behavior as phosphors. The skin is apparently penetrated by electrons but the particles show improved flow characteristics when in the form of a dry powder. They are readily wetted by water and readily adhere to glass surfaces when the suspensions are dried, the silica apparently acting as a bonding agent to glass.

Nickel, iron, and cobalt powders retain their magnetic characteristics and yet have improved resistance to acids and other corrosive agents, and have a non-conducting nature due to the skin of silica. They are thus improved as to their magnetic properties when used, for example, in electromagnetic cores for high frequency currents.

Glass, as well as organic fibers which are very smooth, may be improved in their slip characteristics by the application of a silica skin. They have increased resistance to slipping. Glass fibers in particular are improved by this treatment in regard to chemical resistance. Glass fibers are extremely susceptible to attack by water, especially where the fibers are ultrafine. By the application of a skin of silica which acts to protect the fiber they are rendered resistant to such deterioration.

The application of a silica skin upon cores of finely divided and dispersed asbestos fibers provides suspensions which show good felting characteristics when formed into a sheet, while adhesion between the asbestos fibrils in a sheet is poor without the presence of the silica skin.

In order that the invention may be better understood the following specific illustrative examples are given in addition to those already described:

*Example 1.—Silica upon a core of chrysotile asbestos; simultaneous silicate and acid feed*

Number two grade chrysotile asbestos from Quebec,

Canada was dispersed in water at 1% solids concentration by mixing it in a Waring Blendor at full speed (about 12,000 r.p.m.) for 6 minutes after having added 0.25 milligram moles of aluminum acetate and 0.005 milligram moles of barium acetate per gram of the asbestos. The fibers were filtered from the dispersion, washed, dried and resuspended in water at 1% solids concentration. This suspension was slowly added to an equal volume of rapidly agitated sodium silicate solution containing 0.5% $SiO_2$ and 0.16% $Na_2O$ by weight. The resulting suspension was filtered and the filter cake was suspended in a sufficient amount of water to make the concentration of asbestos 0.5% by weight. The pH of this suspension was 10.0.

Four liters of this suspension were heated to 95° C. and 2000 cc. each of sodium silicate solution (4% $SiO_2$ and 1.25% $Na_2O$) and 1.57% sulfuric acid were added simultaneously at a controlled uniform rate over a period of 3½ hours while vigorous agitation was maintained. The sodium silicate and acid were added in such proportion as to maintain the pH at 10.6–10.7 throughout the run, the sodium ion concentration being maintained below 1 N. The resulting dispersion was filtered and the filter cake was thoroughly washed to remove all free colloidal silica. The product was dried at 110° C. and then contained 77.8% $SiO_2$ and 10.96% MgO. Since the original asbestos contained 39.9% $SiO_2$ and 41.3% MgO, the amount of silica on the surface of the asbestos was 57.22% of the weight of the product. The asbestos content of the product was 26.5%, the ratio of the weight of the silica coating to the weight of the asbestos therefore being 2.54. Examination with the electron microscope showed that the original smooth surfaces of the asbestos fibers whose diameters had been in the range of 20 to 40 millimicrons were thoroughly coated with a heavy, irregular, but continuous dense coating of silica. The specific surface area of the starting dispersed asbestos fibers as measured by nitrogen adsorption was 40 $M^2/g$., whereas the specific surface area of the final silica-coated product had decreased to 22 $M^2/g$., indicating that a significant increase in size of the particles had resulted and that the silica coating was dense, i.e., non-porous.

*Example 2.—Silica on a core of attapulgite clay*

Attapulgite clay ("Attasol" grade, Attapulgus Clay Co.) was suspended in water at 8% solids concentration and was milled in a porcelain ball mill for three days using glass beads 0.295 inches in diameter. Heavy particles were removed by settling and decantation. The specific surface area of the bead milled clay was 122 $M^2/g$. as determined by nitrogen adsorption. A suspension of 10 grams of the milled clay in 2000 cc. of water at pH 10 was heated to 95° C. A total of 2100 cc. each of sodium silicate solution (4% $SiO_2$ and 1.15% $Na_2O$) and 1.57% sulfuric acid were added simultaneously to the clay suspension at a controlled uniform rate over a period of 5⅔ hours while vigorous agitation was maintained. The pH was kept between 9.2 and 9.5 throughout the run. Examination of the product with the electron microscope showed that the individual discrete attapulgite fibers which originally had an average diameter of about 15 millimicrons and a length of about 1 micron had been coated with a heavy irregular, but continuous dense coating of silica, making the fibers more than twice their original thickness.

*Example 3.—Silica on a core of vermiculite mica*

Vermiculite (Zonolite variety from Lincoln County, Montana) was broken down into pieces less than one inch in diameter and less than ¼ inch thick, and these were heated suddenly at 600° C. for about 15 seconds to cause expansion and exfoliation of the structure due to the sudden vaporization of water between the individual vermiculite plates. The product was suspended in water at 20% solids concentration and milled in a porcelain ball mill for 3 days with glass beads 0.295 inch in diameter. The heavier particles were allowed to settle out of the suspension of the bead milled material and were removed by decantation. The remaining material had a surface area of 48 $M^2/g$. as determined by nitrogen adsorption.

A suspension of 25 grams of the fine bead milled vermiculite in 5 liters of water was brought to pH 10 with sodium hydroxide and heated to 95° C. A total of 2500 cc. each of sodium silicate solution (4% $SiO_2$ and 1.25% $Na_2O$) and 1.57% sulfuric acid were added to the vermiculite suspension simultaneously at a controlled uniform rate over a period of 6 hours while continuous vigorous mixing of the suspension was maintained. The pH was kept between 9.6 and 10.1 throughout the run. Examination of the product with the electron microscope indicated that a heavy continuous dense layer of silica had deposited on the surface of the discrete vermiculite plates.

*Example 4.—Silica on a core of halloysite clay*

Halloysite clay (Indianaite variety from Bedford, Indiana) was broken up and roughly ground in a mortar, obvious impurities being removed by hand. Electron micrographs revealed that the clay contained needle-like particles an average of about 100–200 millimicrons long and 20 to 50 millimicrons wide. The powder was then put through a Raymond hammer mill and was finally suspended in water at 20% solids concentration and milled in a porcelain ball mill with glass beads 0.295 inch in diameter for a period of 3 days. The milled clay had a surface area of 63 $M^2/g$. as determined by nitrogen adsorption. Fifty grams of the milled clay was suspended in 9950 grams of water (0.5% solids), brought to pH 10 with sodium hydroxide and heated to 95° C. Five liters each of sodium silicate solution (4% $SiO_2$ and 1.25% $Na_2O$) and 1.57% sulfuric acid were added simultaneously at a controlled uniform rate over a period of 5 hours while vigorous stirring was maintained. The pH was kept between 9.7 and 10.3 and the sodium ion concentration less than 1 N throughout the run. Electron micrographs showed that a thick, irregular, but continuous dense coating was formed over the entire surface of the individual halloysite particles, increasing their thickness to two or three times that of the original particles.

*Example 5.—Silica on a core of halloysite clay*

A sample of the beadmilled clay suspension prepared in Example 4 containing 12 grams of clay (dry basis) was diluted to 2.4 liters and heated to 95° C. with rapid agitation. The pH of the heel was 10.2. A total of 1.8 liters each of sodium silicate solution (containing 6% $SiO_2$ and 1.87% $Na_2O$) and 2.38% sulfuric acid were added simultaneously, but separately, at a controlled uniform rate over a period of 6 hours, the molar ratio $SO_3$:$Na_2O$ of the feed materials was 0.8, the final pH being 10.5. A total of nine parts by weight of silica was added to the system for each part of clay originally present. The siliceous substrate contained a continuous, thick coating of dense silica around the halloysite particles, causing an increase in their size to an average of approximately 100 millimicrons wide and 500 millimicrons long, as demonstrated by examination with the electron microscope.

*Example 6.—Silica on a core of talc*

Double air-floated fibrous talc was suspended in water at 20% solids concentration and milled in a porcelain ball mill with glass beads 0.295 inch in diameter for 3 days. The milled talc had a surface area of 36 $M^2/g$. as determined by nitrogen adsorption. Twenty-five grams of the milled talc was suspended in 5 liters of water (about 0.5% solids concentration) and brought to 95° C. A total of 2500 ccs. each of sodium silicate solution (4% $SiO_2$ and 1.25% $Na_2O$) and 1.57% sulfuric acid were added simultaneously at a controlled uniform rate over a period of 4⅓ hours while vigorous mixing was maintained. The pH was kept between 9.8 and 10.3, and the sodium ion concentration below 1 N throughout the entire run. Examination of the product with the electron microscope showed that a heavy, dense, irregular but continuous coating of silica had formed over the entire surface of the talc particles.

*Example 7.—Silica on a core of crocidolite asbestos*

Crocidolite asbestos (Prieska District, Griqualand, West South Africa) was hand cobbed and put through a Raymond hammer mill to reduce it to a light, fluffy, blue product. The product was suspended in water and milled in a porcelain ball mill for a period of five days, using glass beads 0.295 inch in diameter, the concentration of fiber being increased from 1 to 6% by the addition of more crocidolite to the aqueous suspension from time to time. Undesirable heavy particles were separated from the resulting suspension by settling and decantation.

Electron microscopic examination revealed that the fiber length was, on the average, several microns, but the diameters of the crocidolite fibers were, on the average, several times the diameter of the chrysotile fibers of Example 1.

A suspension of 120 grams of the milled fiber in 3.7 liters of water was treated with sufficient 3 normal HCl to keep pH at from 1 to 2 for about 22 hours at room temperature and 7 hours at 60° C., and was finally treated with an excess of 10% HCl for 12 hours at 100° C. The product was filtered, and the filter cake washed relatively free from salts by three resuspensions in distilled water, followed by filtration. The wet filter cake was finally suspended in water at ½% solids and brought to pH 10 by the addition of sodium silicate solution ($SiO_2/Na_2O$ mole ratio=3.36), which resulted in the presence of 0.15 gram of $SiO_2$ per gram of acid treated crocidolite. Two liters of this suspension were maintained at 95° C. and stirred vigorously, while 685 ccs. each of sodium silicate solution (4% $SiO_2$ and 1.5% $Na_2O$ by weight) and 1.57% sulfuric acid were added simultaneously at a controlled uniform rate for a period of 4 hours. The pH was kept between 10 and 10.1 and the sodium ion concentration below 1 N throughout the run. Examination of the product with the electron microscope demonstrated that heavy, dense, relatively rough, but continuous coating of silica had been formed over the acid treated crocidolite fibers.

*Example 8.—Silica on a core of kaolin clay*

Kaolin (Bardon clays containing plate-like particles essentially all of which pass through a 325 mesh screen and 80–85% of which have diameters equivalent to less than 2 microns) was milled in a porcelain ball mill at 10% solids concentration with glass beads 0.295 inch in diameter for a period of 7 days. A total of 1,530 grams of an aqueous suspension containing 100 grams of the milled kaolin (dry basis) was treated with 304 grams of C. P. sulfuric acid (95.5% $H_2SO_4$) at 100° C. for 12 hours in a flask equipped with reflux condenser and mercury sealed stirrer. The reaction mixture was cooled, the acid layer removed by decantation, and the clay washed 3 times by thorough suspension in water, followed by filtration, to remove practically all of the salt. The wet filter cake was finally suspended in water at ½% solids concentration, was adjusted to pH 10 by the addition of sodium hydroxide, and was heated to 95° C. To 2 liters of this suspension vigorously stirred at 95° C. were added, simultaneously, 750 ccs. each of sodium silicate solution (4% $SiO_2$ and 1.25% $Na_2O$ by weight) and 1.57% sulfuric acid at a controlled uniform rate over a period of 4½ hours. Examination of the product with the electron microscope revealed that the platy, kaolin particles had been covered with a thick, dense, continuous coating of silica.

*Example 9.—Silica on a core of glass fibers*

A 202 grams portion of sodium silicate solution (J.M. grade containing 29.6% $SiO_2$ and 9.2% $Na_2O$) was diluted to two liters, heated to 95° C., and vigorously agitated by means of a circulating pump. A total of 14.25 liters of sodium silicate solution (containing 855 grams $SiO_2$ and 265 grams of $Na_2O$ and 4.410 cu. ft. of carbon dioxide gas were fed into the starting silicate solution at a controlled uniform rate over a period of eleven hours while vigorous mixing of the mixture was maintained. After the first 1½ hours the addition of water to the system was begun, a total of 7 liters being added over the next 1¼ hours. Eight and one-half hours after the start of the run a sample of glass wool (Pyrex brand "Fiberglas" from Owens-Corning Fiberglas Corp.) inclosed in a wire screen, was suspended in the system, the experiment being continued without interruption. The temperature was maintained at 95° C., the pH at 10.2 to 10.6, and the sodium ion concentration below 1 N throughout the experiment. The loose "Fiberglas" matt was removed at the end of the run after having been in the suspension for 2½ hours. It was rinsed several times with distilled water and dried. Examination of the starting untreated fiber with the electron microscope at 4000 power magnification showed that the fiber surfaces were smooth and straight. After the above treatment, the fibers were observed under the electron microscope to have irregular roughened surfaces, indicating that a silica coating had been polymerized on them. Samples of glass cloth on which silica had been polymerized by a process similar to that described above showed greatly improved slip resistance and body as a result of the silica coating.

*Example 10.—Silica on a core of chrysotile asbestos—Acid feed*

Number 2 grade chrysotile asbestos from Quebec, Canada was dispersed in water with aluminum acetate, dried, and resuspended in water at 1% solids concentration, as described in Example 1. This suspension, containing 20 grams of the asbestos, was added slowly to a mixture of 540 grams of aqueous sodium silicate (J.M. grade, containing 29.6% $SiO_2$ and 9.3% $Na_2O$) in 2 liters of solution. Vigorous mixing was maintained throughout the addition. The final suspension contained 4% $SiO_2$ and 0.5% asbestos by weight. The pH was 10.9. The suspension was heated to 95° C. and 2000 ccs. of 0.67 normal sulfuric acid was added at a controlled uniform rate over a period of four hours with continuous, vigorous mixing. The mixture was cooled, filtered, and the filter cake washed relatively free from salts. Electron micrographs of a portion of the filter cake redispersed in water showed that a silica coating 21 millimicrons thick had been applied to the discrete, colloidal asbestos fibers whose average diameter inside the coating was observed to be 41 millimicrons. The silica coating, which was smooth and continuous, could readily be distinguished from the asbestos substrate, since one was less opaque to the electron beam than the other.

*Example 11.—Silica on a core of nickel flake*

Powdered ferromagnetic nickel flake (Product MD 650, Metals Disintegrating Company, Elizabeth, New Jersey) was thoroughly extracted with hot chloroform, dried, then extracted with a hot mixture of 80 parts by weight of 10% aqueous sodium hydroxide and 20 parts by weight of isopropyl alcohol, to remove oil and fatty acids, was filtered and washed with water until the pH of the suspension was 10.3. Four hundred grams (dry weight) of the nickel powder was suspended in 4124 g. of water containing 71 g. of sodium sulfate and 405 g. of sodium silicate solution (containing 120 g. $SiO_2$ and 37.5 g. $Na_2O$) and was heated to 95° C. While the suspension was maintained at this temperature with vigorous stirring, dilute sulfuric acid (0.67 N) was added gradually over a period of 3½ hours. The pH before the addition of sulfuric acid was 11.00 and the final pH was 9.87. The treated nickel was filtered from the suspension, reslurried in water, adjusted to pH=7, filtered, washed, and dried at 110° C. In this way excess free silica was removed.

Chemical analyses of the product showed that it contained 8.13% $SiO_2$ and 85.56% nickel. The coated nickel was much less readily attacked by nitric or hydrochloric acids than the untreated material. The electrical resistance of a compressed sample of the silica coated nickel was greater than 30 million ohms at pressures from atmospheric to 35 tons/sq. in. in comparison with a resistance of only 30 ohms for the untreated nickel powder under the same conditions.

*Example 12.—Silica on a core of nickel flake— Simultaneous acid and silicate feed*

Powdered ferromagnetic nickel flake was purified by extraction as described in Example 11. One hundred-sixty grams (dry weight) of the nickel powder was suspended in 2 liters of 0.2 molar (14.2%) sodium sulfate solution, and was heated to 95° C. A total of 400 ccs. each of sodium silicate solution (4% $SiO_2$ and 1.2% $Na_2O$) and 1.27% sulfuric acid were added simultaneously at a controlled uniform rate over a period of 3 hours to the vigorously agitated nickel suspension. The pH at the end of the addition was 10.0. The mixture was filtered, and the filter cake washed and resuspended in 2 liters of water. An additional 400 ccs. each of the sodium silicate and sulfuric acid solutions were added in the same manner over a period of 4½ hours. The final pH was 9.9. The treated nickel flake was filtered from the suspension, thoroughly washed by several resuspensions in water followed by filtration, and was finally suspended in isopropyl alcohol, filtered and dried at 110° C. In this way, all excess silica was removed. Analysis of the product showed that it contained 14.0% silica or 80% of the silica added to the system. As in Example 11, the coated nickel was much less readily attacked by nitric or hydrochloric acids than a control, and pellets of the coated nickel were found to be non-conducting to electricity, whereas pellets of the oil-free nickel readily passed the current. The nickel can be dissolved away from the silica by aqua regia leaving silica flakes comparable in shape to the original nickel, as observed with the electron microscope. The specific surface area of the oil-free nickel before coating was 15.8 $M^2/g$. as determined by nitrogen adsorption. From the silica content, the calculated thickness of the silica coating is therefore about 5 to 6 millimicrons. The specific surface area of the silica coated nickel was 8 $M^2/g$.

*Example 13.—Silica on a core of colloidal alumina*

A 1% sol of colloidal alumina was prepared by adding a solution of aluminum chloride (38% $AlCl_3 \cdot 6H_2O$) to about 2.2 times its weight of aqua ammonia (4%) at room temperature to precipitate hydrous alumina at a pH of 8–9. The precipitate was filtered, washed to remove ammonium chloride, suspended in water with agitation and heated to 95° C. for one-half hour to stabilize it. The product was then passed through a colloid mill to disperse the alumina in the sol. This method is described in detail in copending application Serial No. 28,277, filed May 20, 1948, by Bechtold and Stark for Process and Products Therefrom, now U.S. Patent 2,590,833. The resulting sol contained 1% $Al_2O_3$ and 0.035% Cl. The pH of the solution was 4.8. A 2500 gram portion of this 1% alumina sol was added gradually with vigorous agitation to 2500 grams of a sodium silicate solution containing 0.3% $SiO_2$ and 0.12% $Na_2O$ by weight. The final pH of the dispersion was 10.3. The mixture was heated to a temperature of 95° C. and 2500 ccs. each of a solution of sodium silicate (containing 4% $SiO_2$) and 1.27% sulfuric acid were added simultaneously at a controlled uniform rate over a period of 4 hours. The pH was maintained between 10.1 and 10.3 throughout the reaction. Electron microscopic examination of the product indicated that it consisted of flocks of short alumina needle-like particles about 100 m$\mu$ long which were heavily coated with silica. No free colloidal silica nuclei were observed in the solution. The silica-coated alumina sol dried on glass to a film which was hard and water-resistant, in contrast to the water-sensitive films obtained from the sol of uncoated alumina. The silica-coated alumina was filtered from the dispersion, washed, and dehydrated by azeotropic distillation of the water from butanol. After removal of the butanol, and drying, the product was a stable gel of very low bulk density, 0.06 grams per cc. under a compressive loading of 3 p.s.i. and 0.147 grams per cc. under a compressive load of 78 p.s.i.

*Example 14.—Silica on a core of aluminum flake*

An hydrophobic aluminum flake pigment of the type used in the manufacture of aluminum paints was extracted twice over a period of two hours, with a hot 2:1 chloroform: carbon tetrachloride mixture, filtered, dried, and finally refluxed in 0.25% sodium silicate solution in order to remove oils and fatty acids from the surface. After washing the product with water and drying, it had a specific surface area as determined by nitrogen adsorption of 51 $M^2/g$.

A 120 gram portion of the aluminum flake was suspended in water at 2.4% solids concentration and enough sodium sulfate was added to make the solution .2 normal in sodium ion. The initial pH of the suspension was 9.3. The suspension was heated to a temperature of 95° C., and 1000 cc. each of a sodium silicate solution (containing 4% $SiO_2$ and 1.25% $Na_2O$) and 1.57% sulfuric acid solution were added simultaneously, but separately, at a controlled uniform rate over a period of 2 hours. Thus, the equivalent of 0.33 grams of silica were added per gram of aluminum flake in the suspension. The final pH of the mixture was 9.5. The suspension was filtered, washed with water and dried at 110° C. Chemical analysis showed that the product contained 15.6% $SiO_2$. It had a surface area of 40 $M^2/g$., which is approximately that expected for the amount of silica deposited upon the surface as a coating. The product was a free-flowing powder somewhat lighter in color than the original material.

*Example 15.—Silica on a core of iron powder*

A finely divided carbonyl iron powder containing 98.2% Fe and containing spherical particles having a weight average particle diameter of 3 microns corresponding to a surface area of about 0.26 $M^2/g$., and having a particle density of 7.81 grams per cc., and a bulk density of 3.5 grams per cc., was used in this experiment. Two hundred-fifty grams of this iron powder and 17.3 grams of sodium sulfate were mixed with 1220 cc. of water to form a suspension containing 16.7% of the iron by weight. The pH of the suspension was adjusted to 9.4 by the addition of 3.5 cc. of 1 normal sodium hydroxide solution. The mixture was then heated to 95° C., and was agitated vigorously. To this heel there was added 1000 cc. each of sodium silicate solution (containing 0.4% $SiO_2$ and 0.12% $Na_2O$) and a solution containing 0.157% $H_2SO_4$ and 2.44% $Na_2SO_4$. The solutions were added simultaneously but separately at a controlled uniform rate while vigorous mixing was maintained. The addition was carried out over a period of 4 hours, the final pH being 9.5 and the sodium ion concentration being maintained at 0.2 normal. A total of 0.015 gram of silica was added for every gram of the iron powder present. The suspension was washed with water by decantation, adjusted to pH 7.1, filtered, washed with water and isopropyl alcohol, and was finally dried in a desiccator over calcium chloride. The dry powder was a freely-flowing black powder. A test core of the coated iron powder had an electrical resistance of greater than $10^7$ ohms under a compressive load of 6000 p.s.i. gauge, compared to an uncoated sample which was highly conducting under the same test conditions.

This shows the effectiveness of the silica coating in insulating the iron particles from one another.

*Example 16.—Silica on a core of zinc sulfide*

A zinc sulfide phosphor having an average particle size of 10 microns which corresponds to a specific surface area of 0.15 M²/g., was suspended in water at a concentration of 25% by weight; to an aqueous suspension of 200 grams of the zinc sulfide there was added 11.3 grams of sodium sulfate and the suspension was diluted to 800 grams. The pH was adjusted to 9.2, the sodium ion normality being 0.2 normal. The suspension was heated to 95° C. and 400 cc. each of a solution of sodium silicate (containing 2.5% $SiO_2$) and a solution of 1.06% $H_2SO_4$ were added simultaneously but separately at a controlled uniform rate over a period of 4 hours. The final pH was 9.8. Thus, the weight of silica added was 5% of the weight of the zinc sulfide. The product was filtered, washed by decantation, and was finally filtered and washed with isopropyl alcohol and dried.

The entire preparation was carried out in the dark by surrounding the apparatus with a suitable shield. The silica coated product showed no discoloration and was a very free-flowing powder in contrast to the uncoated zinc sulfide which did not flow readily. The total amount of silica deposited on the zinc sulfide was 0.6% by weight. This corresponds to a coating thickness of about 40 millimicrons. The coated zinc sulfide still functioned as a phosphor, showing only a slight decrease in brilliance.

*Example 17.—Silica on a core of titania*

A 2000 g. sample of a powdered calcined titania pigment (rutile $TiO_2$) was suspended in 10 liters of water, and the pH of the suspension was raised to 10.0 by the addition of sodium hydroxide. The slurry was heated to 95° C., and 100 cc. each of a sodium silicate solution (4% $SiO_2$ and 1.2% $Na_2O$) and 1.57% sulfuric acid were added simultaneously but separately at the rate of 15 cc. per minute, while vigorous agitation of the suspension was maintained. The pH at the end of the run was 8.7. The suspension was filtered, washed by decantation, and the pH was adjusted to 6.5 with sulfuric acid. The slurry was then filtered, the filter cake washed twice and dried in air. The product was a free-flowing powder, somewhat whiter in appearance than the untreated titania. The skin of silica is dense and has a low oil adsorption compared to a coating of porous silica gel.

*Example 18*

Washed cotton cloth was supported on a metal frame and suspended in 25 liters of water at pH 10 and 95° C. A total of 12½ liters each of sodium silicate solution (containing 4% $SiO_2$ and 1.25% $Na_2O$) and 1.57% sulfuric acid were added simultaneously but separately at a controlled uniform rate over a period of 5½ hours, while vigorous mixing was maintained. This was followed under the same conditions by the addition of 25 liters each of sodium silicate solution (containing 6% $SiO_2$ and 1.87% $Na_2O$) and 2.36% sulfuric acid over a period of 5 hours, and finally by the addition of 50 liters each of sodium silicate solution (containing 4% $SiO_2$ and 1.25% $Na_2O$) and 1.57% sulfuric acid over a five hour period. The final concentration of $SiO_2$ was 2% by weight. The cloth was removed, rinsed with water, and dried at room temperature. The dried cloth had a good hand and showed good resistance to fiber slippage. The ash content of the silica coated cloth was 2.97% compared to an ash content of 0.23% of the untreated material, thus indicating that the silica coating on the fibers was 2.74% of the total weight. Examination of the ashed sample with the electron microscope showed that the silica remained as dense, continuous, fiber-shaped pseudomorphs of the cotton fibers around which it had been deposited.

*Example 19*

Washed cotton cloth was treated with a dilute basic aluminum chloride solution (containing 0.15% Al) for one minute at room temperature, was then dipped into about 3% ammonium hydroxide solution, and was dried at about 27° C. A sample of the cloth treated with the mordant in this manner was mounted on a metal frame and suspended in the reaction mixture described in Example 18, and was treated with sodium silicate and sulfuric acid exactly as described in Example 18. At the end of the run, the cloth was removed, rinsed in water, and dried at room temperature. It showed an ash content of 6.85 compared to an ash content of 0.33 for the original mordant treated cloth, demonstrating that the silica coating on the cloth was 6.52% of the total weight.

*Example 20*

A sample of nylon cloth was treated with stearato chromic chloride solution (containing 0.2% chromium) for one minute at room temperature, followed by neutralization with a solution containing 16.5% urea, 5% sodium formate, and 0.2% formic acid, and finally drying at 125° C. The mordant treated cloth was supported on a metal frame and suspended in the reaction mixture described in Example 18, and was treated with sodium silicate and sulfuric acid exactly as described in Example 18. At the end of the run, the cloth was removed, rinsed with water, and dried. The silica coated product had an ash content of 5.08% as compared to a blank of mordant treated nylon which has an ash content of about 0.6. The treated nylon showed greatly improved resistance to fiber slippage, improved hand, and excellent water penetration in contrast to the untreated material.

*Example 21.—Silica on a core of titanium dioxide*

A 227 g. sample of titanium dioxide pigment (du Pont Ti-Pure, grade R-110) was dispersed in sufficient 1.2 N ammonium hydroxide to form a fluid slurry by mixing in a Waring Blendor at full speed as in Example 1. This slurry was poured into boiling water to give a suspension containing 12% by weight of titanium dioxide.

Concurrently, a solution of active silica was prepared by passing a solution of sodium silicate containing 3.3% $SiO_2$ and 1.02% $Na_2O$ at room temperature through a bed of cation exchange resin in the hydrogen form (Dowex 50) of sufficient capacity so that all of the alkali was removed.

While maintaining the titania slurry at 100° C. and under conditions of vigorous agitation, the solution of active silica was added at a rate of 0.177 g. $SiO_2$ per minute over a period of 5.4 hours. The pH measured at 100° C. was maintained at about 9 by the addition of ammonia. At the end of the addition the slurry was allowed to cool to room temperature.

The product had a pH of 10.2 and contained 15.6% solids. The solids contained 20% silica.

The product was shown to have remarkable properties as a delusterant for nylon yarn. Using a 2% loading and comparing with a typical untreated titania delusterant, the following data were obtained:

| Measurement | Result | |
| --- | --- | --- |
| | Product of Example | Untreated $TiO_2$ |
| Quality of Spinning | Excellent | Good. |
| Quality of Drawing | do | Do. |
| Half Life in Weatherometer [a] | 1,400 hrs | 150 hrs. |
| Abrasiveness [b] | 4.2 | 1.5–2. |

[a] This test measures the photodurability of the delustered yarn and is expressed as the time required for the tenacity of the yarn to decrease to one half of its original value under a light source of constant intensity.
[b] The abrasiveness of the yarn is defined as 1000/t, where t is the time in seconds required for the yarn moving at a fixed velocity to cut a standard copper wire under definite tension.

Example 22—Silica on a core of titanium dioxide

A 960 g. sample of titanium dioxide pigment (du Pont Ti-Pure, grade R–110) was dispersed in ammonia as described in Example 21, and poured into boiling water to give a suspension containing 6% $TiO_2$.

Concurrently, a solution of active silica was prepared as described in Example 21.

While maintaining the titania slurry at 100° C. and under conditions of vigorous agitation, the solution of active silica was added at a rate of 0.403 g. $SiO_2$ per minute over a period of 10 hours. The pH, measured at 100° C., was maintained at about 9 by addition of ammonia.

The product had a pH of 7 and contained 7.5% solids. The solids contained 20% silica. On evaluation as a delusterant for nylon yarn, the product exhibited the following properties:

Quality of spinning ______________________ Good
Quality of drawing _______________________ Fair
Half life in weatherometer _______________ 3000
Abrasiveness ____________________________ 2.1

Definition of terms and values on a typical control run are given in Example 21.

Example 23.—Silica on a core of titanium dioxide

A 160 g. sample of titanium dioxide pigment was dispersed in ammonia as described in Example 21, and poured into boiling water to give a suspension containing 4.3% $TiO_2$.

Concurrently, a solution of monosilicic acid was prepared by deionization of a solution of sodium meta silicate containing 1.1% $SiO_2$ through a column of Dowex 50 resin as described in Example 21.

While maintaining the titania slurry at 100° C. and under conditions of vigorous agitation, the solution of monosilicic acid was added at a rate of 0.0576 g. $SiO_2$ per minute over a period of 6.6 hours. The pH, measured at 100° C. was maintained at about 8.5 by addition of ammonia.

At the end of this coating procedure, the slurry contained 4.9% solids, which solids analyzed 12.0% $SiO_2$. This slurry was agitated for 19 days to remove by abrasion any loosely adhering silica and then was recoated as follows:

A solution of monosilicic acid was prepared as outlined above and added to the rapidly agitated titania slurry held at 100° C. at a rate of $3.9 \times 10^{-4}$ g. $SiO_2$ per g. $TiO_2$ per minute. The product, after cooling had a pH of 10.3, contained 5.0% solids of which 19.6% was silica. On evaluation in nylon as a delusterant as described in Example 21, the following properties were found:

Quality of spinning ______________________ Good
Quality of drawing _______________________ Fair
Half life in weatherometer _______________ 1900
Abrasiveness ____________________________ 3.7

This application is a continuation-in-part of my copending application Serial No. 252,965, filed October 24, 1951, now abandoned, which in turn was a continuation-in-part of application Serial No. 171,759, filed July 1, 1950, now abandoned.

I claim:

1. In a process for making a product comprising a skin of dense, hydrated, amorphous silica bound upon a core of another solid material, the steps comprising adding active silica in water to an aqueous suspension of a finely divided, water insoluble solid material other than silica which has a surface area of at least one square meter per gram, the particles of said material having a particle size within the range from 1 to 100 millimicrons and having upon their surfaces a metal compound selected from the group consisting of oxides and silicates of a metal which forms an insoluble silicate at a pH between 7 and 11, the pH of said suspension being maintained between 8 and 11, the temperature being maintained between 60 and 125° C., the addition of active silica being made slowly enough so that in the following expression $dS$ is no greater than zero:

$$dS = (A_3D_3) - (A_2D_2)$$

where $dS$ = the change in the observed surface area per unit volume of solid
$A_2$ = the specific surface area of the core or substrate in $M^2/g$.
$A_3$ = the specific surface area of the coated product in $M^2/g$.
$D_2$ = the density of the core in grams per cubic centimeter, this being the density of the material of the core rather than a bulk density of the core particles
$D_3$ = the density of the coated product in grams per cubic centimeter and the addition being continued until the particles are coated with a skin having a thickness within the range of 3 to 100 millimicrons.

2. In a process for making a product comprising a skin of dense, hydrated, amorphous silica bound upon a core of another solid material, the steps comprising adding active silica to an aqueous suspension of a finely divided, water insoluble solid material other than silica which has a surface area of at least one square meter per gram, the particles of said material having at least one dimension less than 5 millimicrons and having upon their surfaces a metal compound selected from the group consisting of oxides and silicates of a metal which forms an insoluble silicate at a pH between 7 and 11, the pH of said suspension being maintained between 8 and 11, the temperature being maintained between 60 and 125° C., the addition of active silica being made slowly enough so that in the following expression $dS$ is no greater than zero:

$$dS = (A_3D_3) - (A_2D_2)$$

where $dS$ = the change in the observed surface area per unit volume of solid
$A_2$ = the specific surface area of the core or substrate in $M^2/g$.
$A_3$ = the specific surface area of the coated product in $M^2/g$.
$D_2$ = the density of the core in grams per cubic centimeter, this being the density of the material of the core rather than a bulk density of the core particles
$D_3$ = the density of the coated product in grams per cubic centimeter and the addition being continued until the particles are coated with a skin having a thickness within the range of 3 to 100 millimicrons.

3. In a process for making a product comprising a skin of dense, hydrated, amorphous silica bound upon a core of another solid material, the steps comprising adding active silica to an aqueous suspension of a finely divided, water insoluble solid material other than silica, made up of aggregates of particles at least one dimension of which is less than 5 microns and having a surface area of at least one square meter per gram, the particles having upon their surfaces a metal compound selected from the group consisting of oxides and silicates of a metal which forms an insoluble silicate at a pH between 7 and 11, the pH of said suspension being maintained between 8 and 11, the temperature being maintained between 60 and 125° C., the addition of active silica being made slowly enough so that in the following expression $dS$ is no greater than zero:

$$dS = (A_3D_3) - (A_2D_2)$$

where $dS$ = the change in the observed surface area per unit volume of solid $A_2$ = the specific surface area of the core or substrate in $M^2/g$.

$A_3$ = the specific surface area of the coated product in $M^2/g$.

$D_2$ = the density of the core in grams per cubic centimeter, this being the density of the material of the core rather than a bulk density of the core particles $D_3$ = the density of the coated product in grams per cubic centimeter and the addition being continued until the particles are coated with a skin having a thickness within the range of 3 to 100 millimicrons.

4. In a process for making a product comprising a skin of dense, hydrated, amorphous silica bound upon a core of another solid material, the steps comprising adding active silica in water to an aqueous suspension of a finely divided, water insoluble, inorganic solid material other than silica which has a surface area of at least one square meter per gram, the particles of said material having a particle size within the range from 1 to 100 millimicrons and having upon their surfaces a metal compound selected from the group consisting of oxides and silicates of a metal which forms an insoluble silicate at a pH between 7 and 11, the pH of said suspension being maintained between 8 and 11, the temperature being maintained between 80 and 100° C., the addition of active silica being made slowly enough so that in the following expression $dS$ is no greater than zero:

$$dS = (A_3 D_3) - (A_2 D_2)$$

where $dS$ = the change in the observed surface area per unit volume of solid $A_2$ = the specific surface area of the core or substrate in $M^2/g$.

$A_3$ = the specific surface area of the coated product in $M^2/g$.

$D_2$ = the density of the core in grams per cubic centimeter, this being the density of the material of the core rather than a bulk density of the core particles $D_3$ = the density of the coated product in grams per cubic centimeter and in addition the rate at which active silica is added does not exceed that shown in the following relationship:

$$S = \frac{(A)}{(200)} 2^n$$

where $$n = \frac{(T-90)}{10}$$

$S$ = maximum parts by weight of active silica which can be added per hour for each part by weight of heteronuclei in the system being treated $A$ = surface area in $M^2/g$. of the heteronuclei $T$ = temperature in degrees C.

and the addition being continued until the particles are coated with a skin having a thickness within the range of 3 to 100 millimicrons.

5. In a process for making a product comprising a skin of dense, hydrated, amorphous silica bound upon a core of another solid material, the steps comprising reacting an alkali metal silicate with a mineral acid in proportions to yield a pH of 8 to 11 thereby to form active silica, adding such active silica to an aqueous suspension of a finely divided, water insoluble solid material other than silica which has a surface area of at least one square meter per gram, the particles of said material having at least one dimension less than 5 millimicrons and having upon their surfaces a metal compound selected from the group consisting of oxides and silicates of a metal which forms an insoluble silicate at a pH between 7 and 11, the pH of said suspension being maintained between 8 and 11, the temperature being maintained between 60 and 125° C., the addition of active silicate being made slowly enough so that in the following expression $dS$ is no greater than zero:

$$dS = (A_3 D_3) - (A_2 D_2)$$

where $dS$ = the change in the observed surface area per unit volume of solid $A_2$ = the specific surface area of the core or substrate in $M^2/g$.

$A_3$ = the specific surface area of the coated product in $M^2/g$.

$D_2$ = the density of the core in grams per cubic centimeter, this being the density of the material of the core rather than a bulk density of the core particles $D_3$ = the density of the coated product in grams per cubic centimeter and the addition being continued until the particles are coated with a skin having a thickness within the range of 3 to 100 millimicrons.

6. In a process for making a product comprising a skin of dense, hydrated, amorphous silica bound upon a core of finely divided titanium dioxide, the steps comprising adding active silica to an aqueous suspension of a finely divided titanium dioxide which has a surface area of at least one square meter per gram, the particles of titanium dioxide having at least one dimension less than 5 microns, the pH of said suspension being maintained between 8 and 11, the temperature being maintained between 80 and 100° C., the addition of active silica being made slowly enough so that in the following expression $dS$ is no greater than zero:

$$dS = (A_3 D_3) - (A_2 D_2)$$

where $dS$ = the change in the observed surface area per unit volume of solid $A_2$ = the specific surface area of the core or substrate in $M^2/g$.

$A_3$ = the specific surface area of the coated product in $M^2/g$.

$D_2$ = the density of the core in grams per cubic centimeter, this being the density of the material of the core rather than a bulk density of the core particles $D_3$ = the density of the coated product in grams per cubic centimeter and the addition being continued until the particles are coated with a skin having a thickness within the range of 3 to 100 millimicrons.

7. A product comprising a skin of dense, hydrated, amorphous silica bound upon a core of another solid material, the core being composed of particles of average diameter from 1 to 100 millimicrons and having a surface area greater than one square meter per gram, the skin having a thickness within the range of 3 to 100 millimicrons, and the density of the skin being such that the difference in surface area per unit volume between the core and the product is as follows:

$$(A_3 D_3) - (A_2 D_2) = \text{no greater than zero}$$

where $A_2$ = the specific surface area of the core or substrate in $M^2/g$.

$A_3$ = the specific surface area of the coated product in $M^2/g$.

$D_2$ = the density of the core in grams per cubic centimeter, this being the density of the material of the core rather than a bulk density of the core particles $D_3$ = the density of the coated product in grams per cubic centimeter.

8. A product comprising a skin of dense, amorphous silica bound upon a core of another solid material, the core having a surface area greater than one square meter per gram and being composed of water insoluble particles having at least one dimension less than 5 microns, the skin having a thickness within the range of 3 to 100 millimicrons, and the density of the skin being such that the difference in surface area per unit volume between the core and the product is as follows:

$$(A_3D_3) - (A_2D_2) = \text{no greater than zero}$$

where $A_2$=the specific surface area of the core or substrate in $M^2/g$.
$A_3$=the specific surface area of the coated product in $M^2/g$.
$D_2$=the density of the core in grams per cubic centimeter, this being the density of the material of the core rather than a bulk density of the core particles
$D_3$=the density of the coated product in grams per cubic centimeter.

9. A product comprising a skin of dense, amorphous silica bound upon a core of another solid material, the core having a surface area greater than one square meter per gram and being a finely divided, water insoluble solid material made up of aggregates of particles at least one dimension of which is less than 5 microns, the skin having a thickness within the range of 3 to 100 millimicrons, and the density of the skin being such that the difference in surface area per unit volume between the core and the product is as follows:

$$(A_3D_3) - (A_2D_2) = \text{no greater than zero}$$

where $A_2$=the specific surface area of the core or substrate in $M^2/g$.
$A_3$=the specific surface area of the coated product in $M^2/g$.
$D_2$=the density of the core in grams per cubic centimeter, this being the density of the material of the core rather than a bulk density of the core particles
$D_3$=the density of the coated product in grams per cubic centimeter.

10. A product comprising a skin of dense, amorphous silica bound upon a core of titania, the core having a surface area greater than one square meter per gram and being composed of titanium dioxide particles at least one dimension of which is less than 5 microns, the skin having a thickness within the range of 3 to 100 millimicrons, and the density of the skin being such that the difference in surface area per unit volume between the core and the product is as follows:

$$(A_3D_3) - (A_2D_2) = \text{no greater than zero}$$

where $A_2$=the specific surface area of the core or substrate in $M^2/g$.
$A_3$=the specific surface area of the coated product in $M^2/g$.
$D_2$=the density of the core in grams per cubic centimeter, this being the density of the material of the core rather than a bulk density of the core particles
$D_3$=the density of the coated product in grams per cubic centimeter.

11. An aqueous dispersion of particles comprising a skin of dense, amorphous silica bound upon a core of another solid material, the core being composed of water insoluble particles of average diameter from 1 to 100 millimicrons and having a surface area greater than one square meter per gram, the said skin having a thickness within the range of 3 to 100 millimicrons, and the density of the skin being such that the difference in surface area per unit volume between the core and the product is as follows:

$$(A_3D_3) - (A_2D_2) = \text{no greater than zero}$$

where $A_2$=the specific surface area of the core or substrate in $M^2/g$.
$A_3$=the specific surface area of the coated product in $M^2/g$.
$D_2$=the density of the core in grams per cubic centimeter, this being the density of the material of the core rather than a bulk density of the core particles
$D_3$=the density of the coated product in grams per cubic centimeter.

12. An aqueous dispersion of particles comprising a skin of dense, amorphous silica bound upon a core of another solid material, the core having a surface area greater than one square meter per gram and being composed of water insoluble, siliceous particles having at least one dimension less than 5 microns, the skin having a thickness within the range of 3 to 100 millimicrons, and the density of the skin being such that the surface area per gram of the product is lower than that of the core material, and the skin having a specific depolymerization rate of from 5 to 20 at a point where 30 percent of the skin has been depolymerized to monomer.

13. In a process for making a product comprising a skin of dense, hydrated, amorphous silica bound upon a core of another solid material, the steps comprising adding active silica in water to an aqueous suspension of a finely divided, water insoluble solid material other than silica and selected from the group consisting of metal powders, oxides of metals which form insoluble silicates at pH 7 to 11, and silicates, sulfides, carbonates, phosphates and halides of metals, which material has a surface area of at least one square meter per gram, the particles of said material having a particle size within the range from 1 to 100 millimicrons and having upon their surfaces a metal compound selected from the group consisting of oxides and silicates of a metal which forms an insoluble silicate at a pH between 7 and 11, the pH of said suspension being maintained between 8 and 11, the temperature being maintained between 60 and 125° C., the addition of active silica being made slowly enough so that in the following expression $dS$ is no greater than zero:

$$dS = (A_3D_3) - (A_2D_2)$$

where $dS$=the change in the observed surface area per unit volume of solid
$A_2$=the specific surface area of the core or substrate in $M^2/g$.
$A_3$=the specific surface area of the coated product in $M^2/g$.
$D_2$=the density of the core in grams per cubic centimeter, this being the density of the material of the core rather than a bulk density of the core particles
$D_3$=the density of the coated product in grams per cubic centimeter and the addition being continued until the particles are coated with a skin having a thickness within the range of 3 to 100 millimicrons.

References Cited in the file of this patent

UNITED STATES PATENTS

| | | |
|---|---|---|
| 2,085,129 | Stoewener | June 29, 1937 |
| 2,280,649 | Kanhofer | Apr. 21, 1942 |
| 2,296,638 | Hanahan | Sept. 22, 1942 |
| 2,657,183 | Bechtold et al. | Oct. 27, 1953 |
| 2,731,326 | Alexander et al. | Jan. 17, 1956 |

UNITED STATES PATENT OFFICE

CERTIFICATE OF CORRECTION

Patent No. 2,885,366                                                                        May 5, 1959

Ralph K. Iler

It is hereby certified that error appears in the printed specification of the above numbered patent requiring correction and that the said Letters Patent should read as corrected below.

Column 3, line 57, for "rubber ar" read -- rubber or --; column 5, line 43, for "viewed on" read -- viewed and --; column 15, line 53, for "1.15%" read -- 1.25% --; column 21, line 37, for "100 cc." read -- 1000 cc. --.

Signed and sealed this 15th day of December 1959.

(SEAL)
Attest:

KARL H. AXLINE
Attesting Officer

ROBERT C. WATSON
Commissioner of Patents